United States Patent

Ohshima

[11] Patent Number: 5,111,548
[45] Date of Patent: May 12, 1992

[54] LIQUID CHECK AND CLOSER

[75] Inventor: Kazuyoshi Ohshima, Tokyo, Japan

[73] Assignee: Sugatsune Industrial Co., Ltd., Tokyo, Japan

[21] Appl. No.: 672,663

[22] Filed: Mar. 19, 1991

[30] Foreign Application Priority Data

May 23, 1990 [JP] Japan .................. 2-133135

[51] Int. Cl.⁵ .............................................. E05F 3/04
[52] U.S. Cl. ........................................... 16/51; 16/52
[58] Field of Search ........................ 16/51-54, 16/58, 65

[56] References Cited

U.S. PATENT DOCUMENTS

| | | | |
|---|---|---|---|
| 2,861,291 | 11/1958 | Milton | 16/65 |
| 3,039,133 | 6/1962 | Milton et al. | 16/65 |
| 3,357,040 | 12/1967 | MacDonald | 16/51 |
| 4,325,164 | 4/1982 | Sasaki | 16/52 |

Primary Examiner—Robert L. Spruill
Assistant Examiner—Carmine Cuda
Attorney, Agent, or Firm—Fleit, Jacobson, Cohn, Price, Holman & Stern

[57] ABSTRACT

A door closer which comprises a damper having a body case including an arm fixed to a door, a rotational shaft formed in the body case, a pair of chambers filled with high viscous liquids, a pair of rotary blades respectively having passages with check valves on the rotational shaft, the rotary blades being rotated together with a rotational shaft by a sub case fixed with a sub arm against a return spring at the time of opening the door, the door being effected by the resistance force of the high viscous liquid against the closing door, a stationary plate fixed to the body case, an intermediate plate so engages as to be rotatable at a predetermined angle against the return spring, a movable plate so engaged with the sub case as to be rotatable together with the sub case, a plurality of rotary connectors respectively movably engaged with a plurality of through holes on the rotating circumferential line of the intermediate plate, and an angle clutch formed with recesses to be engaged with the rotary connectors corresponding to the through holes of the rotary connectors. Thus, the door closer can provide a locking state of power accumulated by a return spring at a predetermined door opening angle and a freely stopping state.

2 Claims, 9 Drawing Sheets

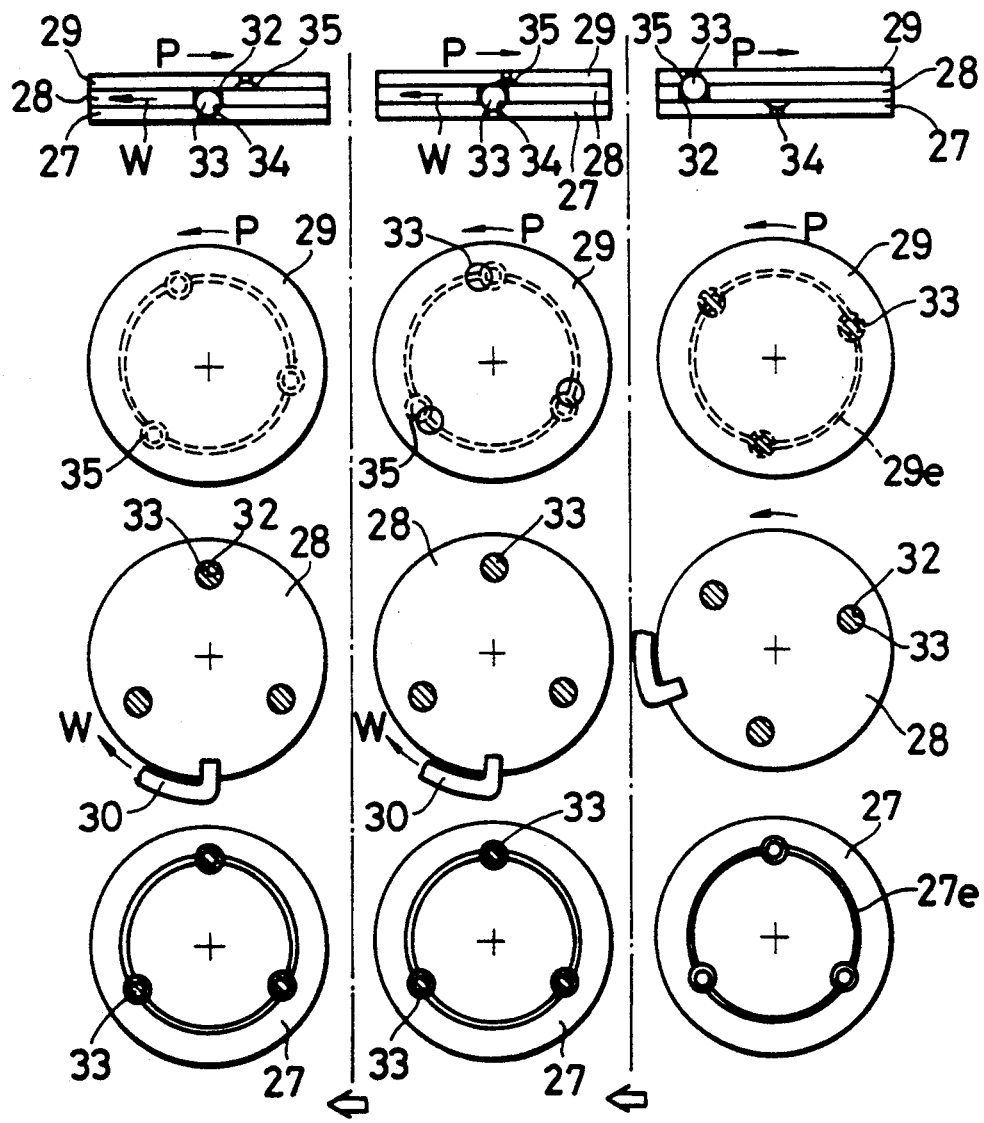

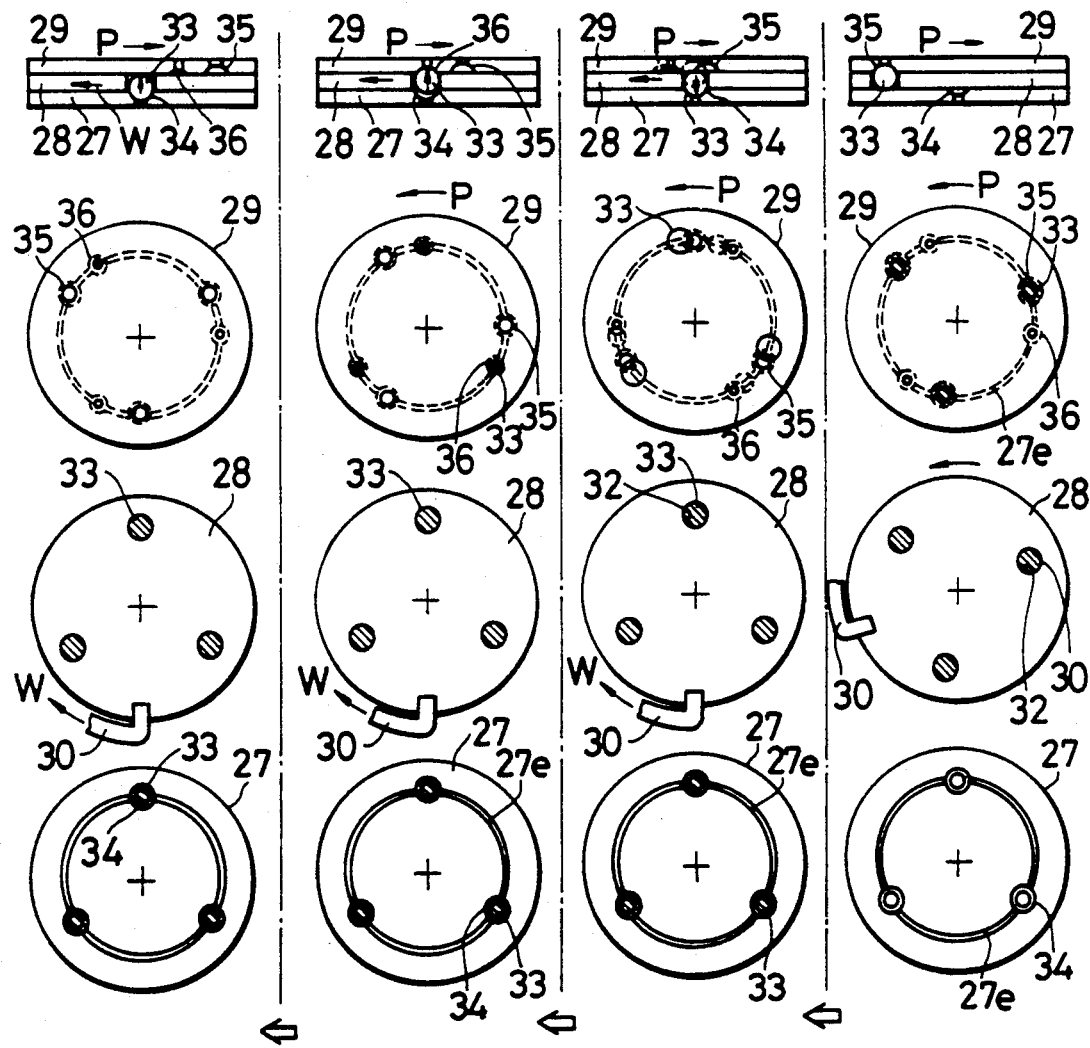

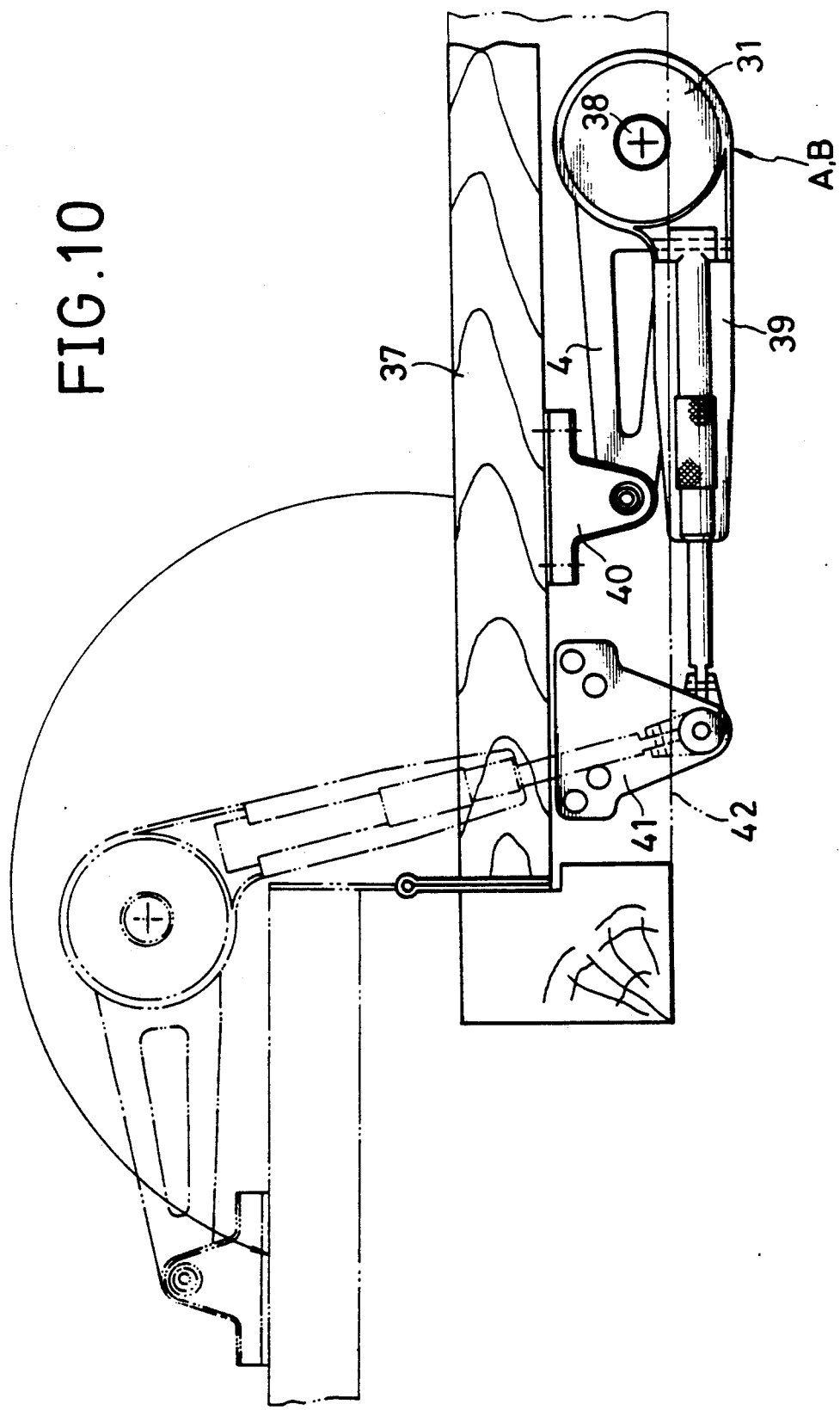

LIQUID CHECK AND CLOSER

BACKGROUND OF THE INVENTION

1. Field of the Invention

This invention relates to a door closer adapted to gradually close a door by employing a high polymer viscous liquid such as polyisobutyne, etc., or other high viscosity liquid and a return spring, automatically closing the door by the accumulated recovering force of the spring and generating a braking force at the door by the resistance force of the high viscous liquid.

2. Description of the Prior Art

A conventional door closer which consists of a hydraulic cylinder provided in a body case of a laterally long shape, a piston telescopically inserted into the hydraulic cylinder through a return spring, a rack engraved on one sidewall of the piston, and a pinion rotatably supported to a pinion shaft to be engaged with the rack at one side of the cylinder is well known.

In the door closer of the arrangement described above, the body case is fixed to the door and a link pivotally secured at one end thereof to be rotatable to the end of an arm fixed to the pinion shaft is provided at the other end thereof with a mounting bracket to be rotatable, and the mounting bracket is fixed to an upper frame. Thus, the door closer is mounted at the door. The piston is moved against the return spring by the pinion at the time of opening the door, and the door is automatically closed by the accumulated recovering force of the return spring at the time of closing the door.

Cutout toothed portions are formed at the rack and the portion of the pinion in the door closer. Thus, the door becomes in a free state in a range from a predetermined door opening angle to a door fully opening angle, and the door can be freely opened and closed, or locked. Further, the teeth of both ends of the rack and the pinion are engaged with each other to lock the door at a predetermined opening angle.

However, in the door closer of the arrangement described above, the piston has power transmission means to be driven by the pinion meshed with the rack formed on one sidewall of the piston. Therefore, there arise various problems as will be described below. Bearings for rotatably supporting the pinion shaft to the body case are relatively quickly worn due to the thrust load of the pinion shaft. When power is transmitted to the piston through the rack of one side, a bending load is applied to the piston in its moving direction. Thus, the piston and the cylinder are irregularly worn. When the door is locked at a predetermined door opening angle or the lock is released, an unpleasant vibration noise is generated due to the forcible disengagement or engagement of both the end teeth of the rack and the pinion. Or, both the end teeth of the rack and the pinion are easily damaged due to the collision of the rack and the pinion when the door is abruptly opened or closed by a strong force or when the door is acted on by strong wind in the closing direction at the locked position of a predetermined door opening angle.

SUMMARY OF THE INVENTION

A primary object of the present invention is to provide a door closer which can eliminate the problems of the conventional door closer and can provide a locking state of power accumulated by a return spring at a predetermined door opening angle and a freely stopping state in which a door can be manually opened or closed at a greater opening angle than the predetermined door opening angle.

Another object of the present invention is to provide a door closer which provides a door with a locking state at a predetermined door opening angle of the door and a freely stopping range greater than the power locking angle of the spring.

Still another object of the present invention is to provide a door closer which can slowly and smoothly close the door by means of the recovering force of the spring and the resistance force of high viscous liquid with a simple mechanism.

In order to achieve the above-described and other objects of the present invention, according to a first aspect of the invention, there is provided a door closer comprising a damper having a body case including an arm fixed to a door, a rotational shaft supported at the center of said body case and formed in said body case, a pair of chambers filled with high viscous liquids communicating via the passages of said rotational shaft, a pair of rotary blades respectively having passages with check valves on said rotational shaft and internally mounted in said pair of chambers, said rotary blades being rotated together with a rotational shaft by a sub case fixed with a sub arm against a return spring at the time of opening the door, the door being automatically closed by the accumulated recovering force of said spring at the time of closing the door, the door being effected by the resistance force of said high viscous liquid against the closing door, a stationary plate fixed to said body case disposed vertically in a stacked state by inserting the rotational shaft of said damper to the center thereof, an intermediate plate so engaged with said rotational shaft as to be rotatable at a predetermined angle against said return spring by said rotational shaft, a movable plate so engaged with said sub case as to be rotatable together with said sub case, a plurality of rotary connectors respectively movably engaged with a plurality of through holes formed at an interval in a circumferential direction on the rotating circumferential line of said intermediate plate and having diameters larger than the thickness of said intermediate plate, and an angle clutch formed with recesses to be disengageably engaged with said rotary connectors corresponding to said through holes of said rotary connectors at said stationary plate and said movable plate in such a manner that said movable plate and said intermediate plate can be locked within a range from a door closing position to a predetermined door opening angle, said movable plate is released from the lock to said intermediate plate by the rotation of said movable plate in the door opening direction by the rotation of said movable plate in the door opening direction at a predetermined door opening angle in the range therefrom up to the door fully opening angle, and said intermediate plate can be locked to said stationary plate.

According to the second aspect of the embodiment of the invention, in addition to the arrangement of the first aspect of the embodiment of the invention, the plurality of door locking recesses to be respectively disengageably engaged with said rotary connectors are formed in depths shallower than those of said recesses of said movable plate corresponding to said recesses of said movable plate on the same circumferential line as that of said plurality of recesses of said movable plate at a wider door opening angle than a predetermined door opening angle at said movable plate so that said movable plate can be locked to said intermediate plate and said stationary plate.

Operation

The external force by the door opening operation is applied to the rotational shaft as a rotary force in one direction of the rotational shaft thereby to rotate the rotational shaft and the rotary blades integral with the rotational shaft in one direction.

At this time, the check valves in the passages of the rotary blades are opened by the flows of the high viscous liquids in the respective chambers, the high viscous fluids are fed to the opposite sides of the respective chambers, and fed from the high pressure chambers of both the chambers to the other low pressure chambers through the passages of the rotational shaft.

Here, since part of the rotary connectors movably engaged with the through holes of the intermediate plate is engaged with the recess of the movable plate so that both the plates are locked at the time of opening the door as described above, the movable plate is rotated in one direction by the door opening force, and the intermediate plate is rotated together in the same direction.

When the intermediate plate is rotated, the return spring latched at the ends to the intermediate plate and the body case is rewound to generate power. As a result, the recovering force is accumulated at the return spring. Thus, the rotary connectors tend to be moved downward by the recovering force of the return spring.

Since the intermediate plate is so set as not to be rotated any further after the intermediate plate is rotated at a predetermined angle, when it is continuously rotated in the same direction as the movable plate, the rotary connectors are disengaged from the recesses of the movable plate, moved to the stationary plate side, and engaged with the recesses of the stationary plate. Thus, the intermediate plate is locked to the stationary plate.

Therefore, the spring power causes a locking state at this angle, and the movable plate becomes free. Consequently, the door becomes in a freely stopping state.

When the door becomes in the freely stopping state as described above, the rotary connectors are applied by a force tending to move themselves upward. Thus, when the movable plate is continuously rotated in the same direction, the rotary connectors are engaged with the shallow door locking recesses of the movable plate, and the door is locked to a predetermined opening angle.

At this time, the rotary connectors are engaged with the recesses of the stationary plate and the door locking recesses of the movable plate.

Further, when the movable plate is rotated in the same direction, the rotary connectors are disengaged from the door locking recesses of the movable plate. Therefore, the movable plate becomes free, and the door becomes in the freely stopping state.

More specifically, according to the first aspect of the embodiment of the invention, the spring power is locked at the predetermined door opening angle, and the door becomes in the door freely stopping state at a greater door opening angle than the predetermined door opening angle.

According to the second aspect of the embodiment of the invention, the door is locked at a further door opening angle from the spring power locking angle, and the door becomes in the door freely stopping state within the range from the door locking angle to the door fully opening angle and the range from the spring power locking angle. Of course, the door becomes in a damper OFF mode in the whole range in the door opening direction.

Then, the door becomes in a damper ON mode in the range from the previous door opening angle to the spring power stopping state in the door closing direction. When the door is further closed, the door becomes in spring power OFF mode and damper OFF mode. Thus, the door is automatically started to close by the accumulated recovering force of the return spring, and slowly closed by the damper.

On the other hand, the operation by the damper is caused by utilizing the resistance force generated when the high viscous liquid is fed through the passage of the rotational shaft from the high pressure chamber to the other low pressure chamber of the chambers in the door closing direction.

More specifically, when the rotational shaft is rotated in the door closing direction, the check valve is pushed by the high viscous liquid to close the passages of the rotary blades.

Therefore, the high viscous liquid is fed from the high pressure chamber to the other low pressure chamber of the chambers through the passages in the rotational shaft. The cross sectional area of the passage is set to that smaller than the passage holes of the rotary blades. Therefore, the resistance force by the high viscous liquid is generated to operate as a damper force.

BRIEF DESCRIPTION OF THE DRAWINGS

The above and other objects as well as advantageous features of the invention will become apparent from the following detailed description of the preferred embodiments taken in conjunction with the accompanying drawings.

FIGS. 6(a), 6b) and 6(c) are respectively explanatory views of an angle clutch at the time of closed door, a spring power lock and a door freely stopping state of the embodiment according to first aspect of the invention;

FIGS. 7(a), 7(b), 7(c) and 7(d) are respectively explanatory views of an angle clutch at the time of closed door, a spring power lock, a door freely stopping state, a spring power lock, a door locking state, a spring power lock and a door freely stopping state of the embodiment according to second aspect of the invention;

FIG. 10 is a plan view showing a using example of the door closer.

DESCRIPTION OF THE PREFERRED EMBODIMENTS

Embodiments of the present invention will now be described with reference to the accompanying drawings.

First, a damper A will be described.

Figure 1:
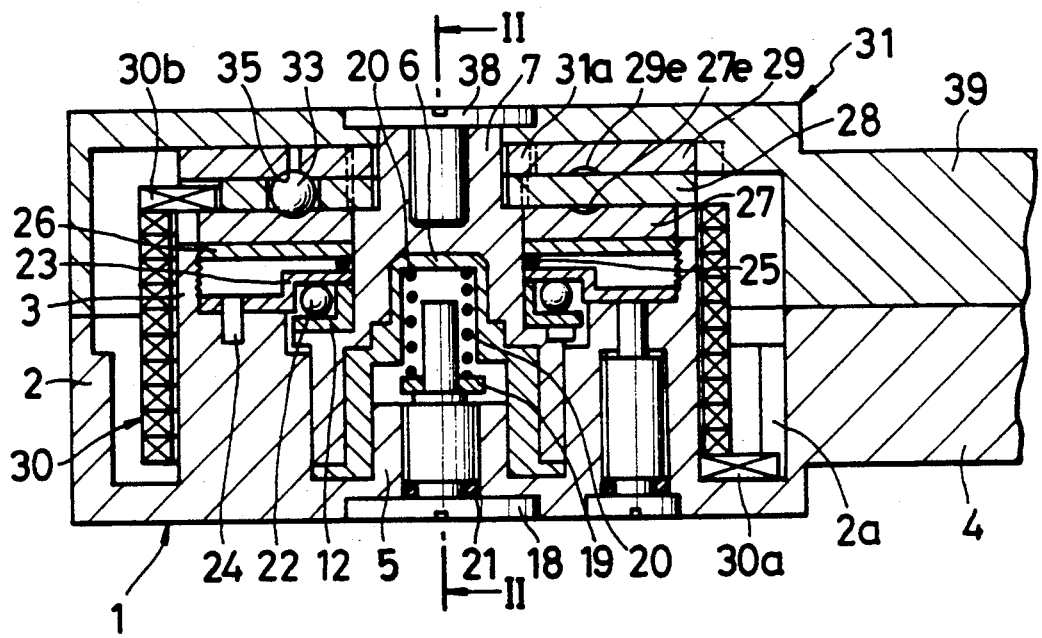
FIG. 1 is a longitudinal sectional view showing an embodiment of a door closer according to the present invention.
Figure 2:
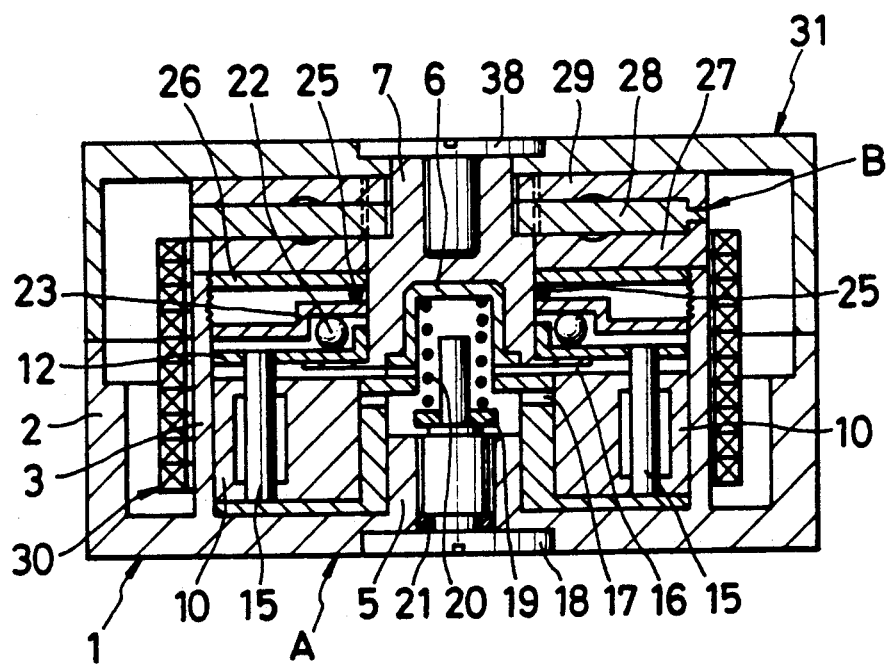
FIG. 2 is a longitudinal sectional view taken along the line II—II as seen from arrows in FIG. 1.
Figure 3:
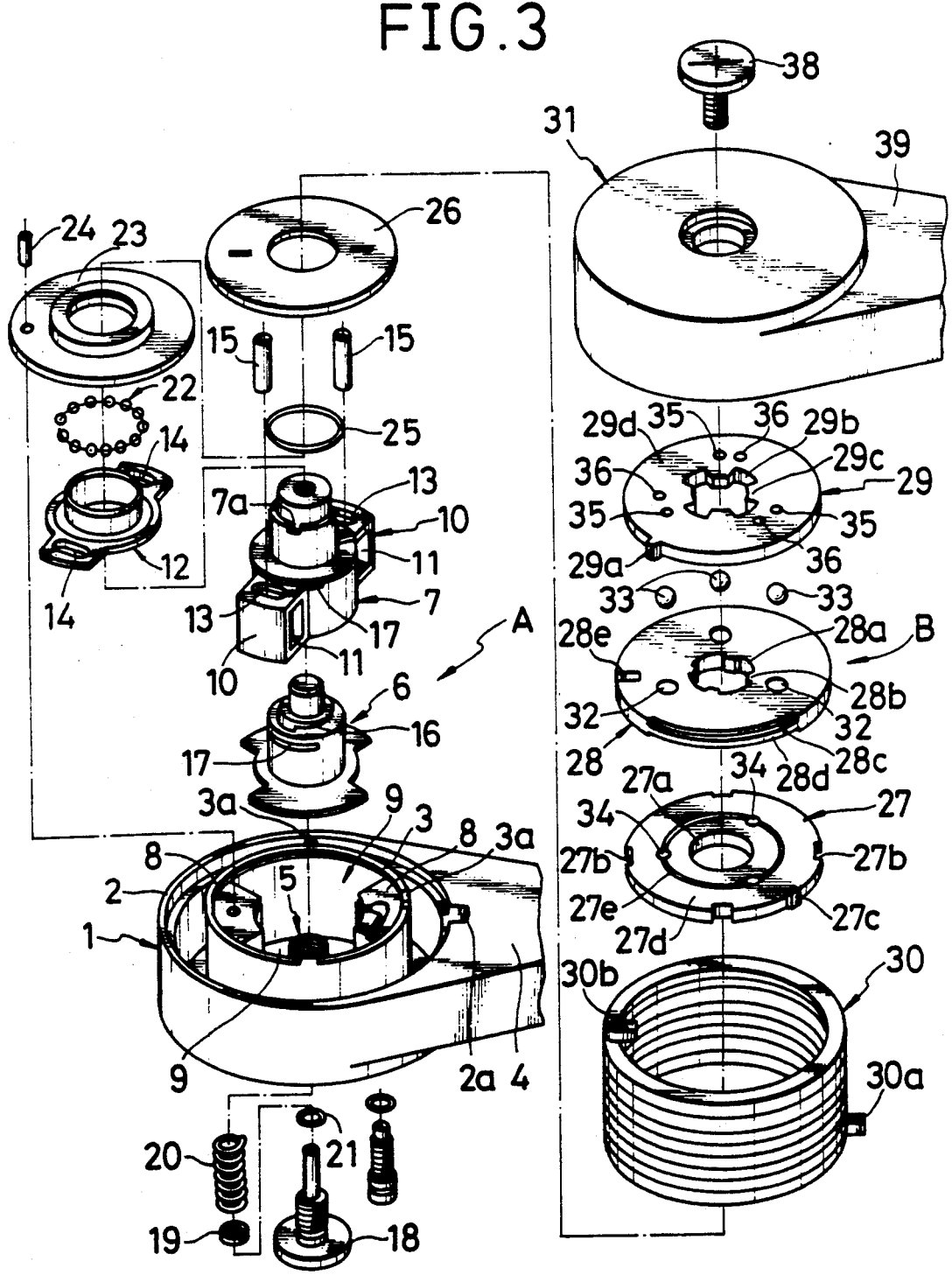
FIG. 3 is an exploded perspective view of the embodiment.
Figure 4D:
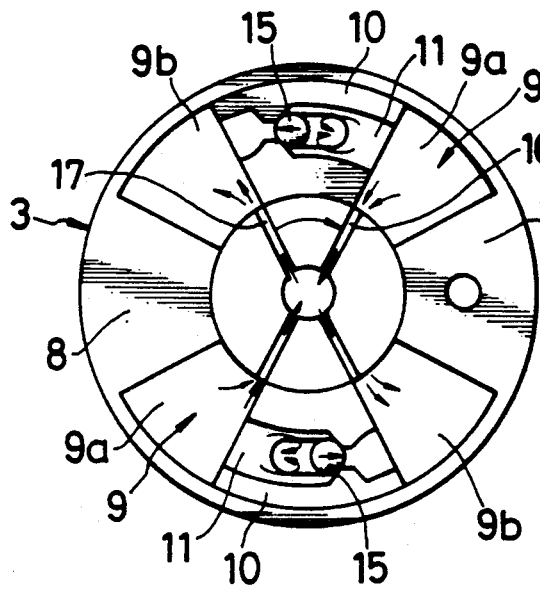
FIGS. 4(a), 4(b), 4(c) and 4(d) are explanatory views respectively showing a damper at the time of closed door, door opening, opened door and door closing in the embodiment of the door closer.
Figure 4A:
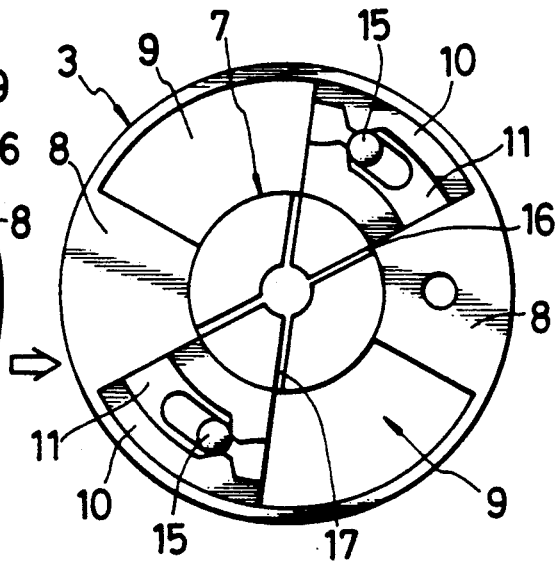
Figure 4C:
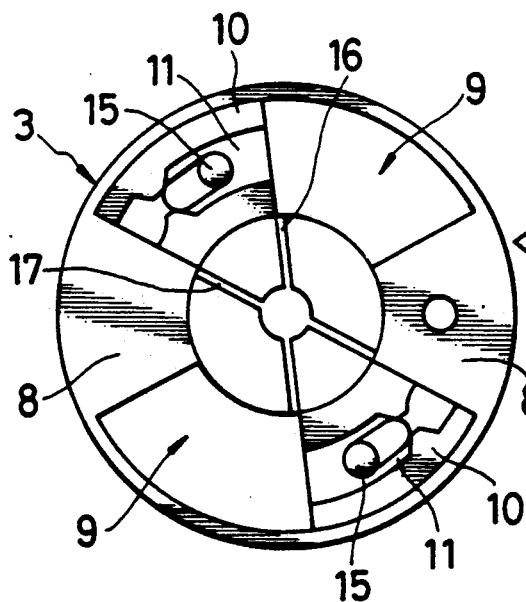
Figure 4B:
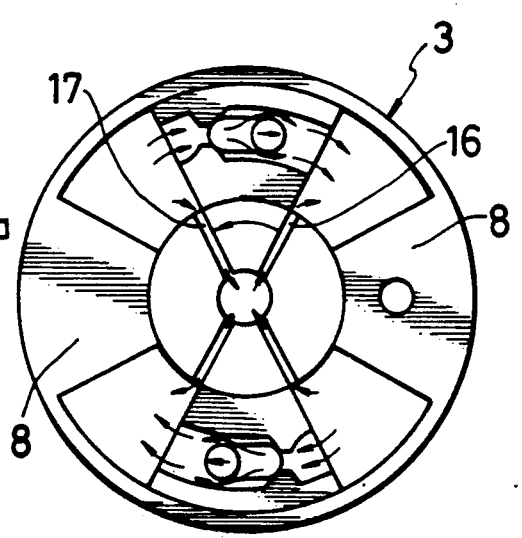

As shown in FIGS. 1 to 3, a body case 1 of a bottomed shape is concentrically and integrally formed with an outer cylinder 2 and an inner cylinder 3, and an arm 4 radially projects from one outside of the outer cylinder 3.

A bearing 6 which is externally engaged with a threaded cylinder 5 erected from the center of the bottom of the inner cylinder 3 is fixed to the central position of the inner cylinder 3 in a non-rotating state. Further, a rotational shaft 7 is rotatably externally mounted on the bearing 6, and a pair of chambers 9 and 9 of substantially sector shape in plane are formed in the inner cylinder 3 by the rotational shaft 7 and projections 8 and 8 formed at the right and left sides of the inner cylinder 3 as shown in FIGS. 4 and 5.

A pair of rotary blades 10 and 10 radially symmetrically projected on the rotational shaft 7, and rotatably internally mounted in the pair of chambers 9 and 9.

Figure 5:
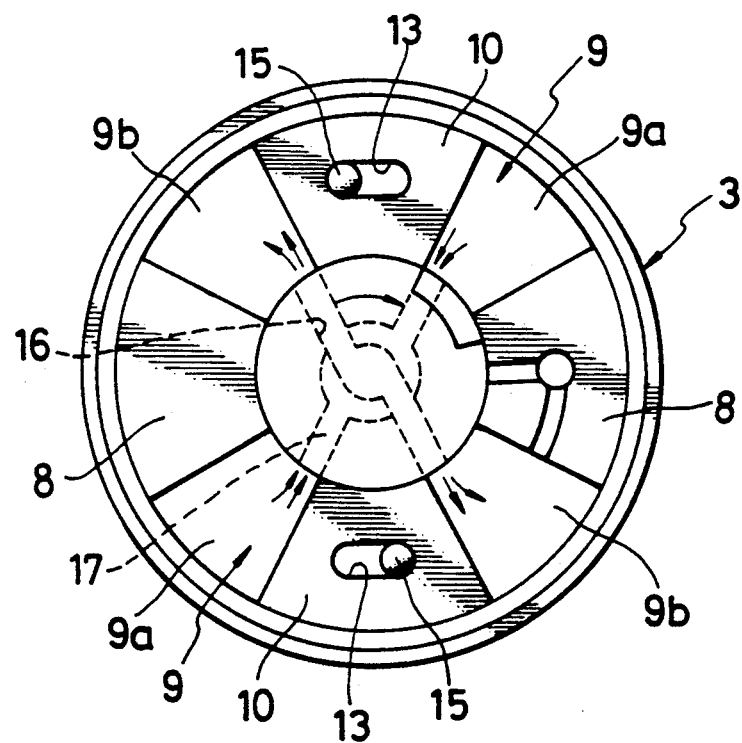
FIG. 5 is a plan view showing the damper of the embodiment.

As shown in FIGS. 4 and 5, passages 11 and 11 are respectively circumferentially passed through the pair of rotary blades 10 and 10 to communicate with high and low pressure chambers 9a and 9b of the chambers 9 and 9. Check valves 15 and 15 of spheres or rolls, etc., are so movably inserted in long holes 13, 13 and 14, 14 passed through the rotary blades 10 and 10 and an outer shaft 12 externally mounted on the rotational shaft 7 in communication with the passages 11 and 11 to open the passages 11 and 11 by the flow of high viscous liquid contained in the inner cylinder 3 by the counterclockwise rotation in FIGS. 4 and 5 of the rotational shaft 7 by the door opening operation as to open or close the passages 11 and 11.

The bearing 6 and the rotational shaft 7 are formed in cylindrical shape, a passage 16 for communicating with the high pressure chambers 9a and 9a of both the chambers 9 and 9 and a passage hole 17 for communicating with the low pressure chambers 9b and 9a are formed in a slit shape in the bearing 6 and the shaft 7.

An adjusting screw 18 engaged from the bottom of the body case 1 with the threaded cylinder 5 through an O-ring 21 is internally mounted through a regulating valve 19 and a regulating spring 20 in the bearing 6. The door is slowly closed by utilizing a damper force when the high viscous liquids in the high pressure chambers 9a and 9a are introduced from the passage 16 into the bearing 6 through a gap between the adjusting valve 19 and the bearing 6 to be discharged from the passage 17 into the low pressure chambers 9b and 9b at the time of closing the door.

The damper force is regulated by varying the gap between the regulating valve 19 and the bearing 6 by vertically moving up or down the regulating valve 19 by vertically threading the adjusting screw 18.

Further, a plurality of rolling balls 22, 22 are placed on the outer shaft 12, the rolling balls 22, 22 are interposed between a shaft holding plate 12 externally mounted on the rotational shaft 7 and the outer shaft 12, the shaft holding plate 23 is fixed to the body case 1 by a pin 24, and O-ring 25 is further externally mounted on the rotational shaft 7, a cover 26 is engaged with the inner cylinder 3, and high viscous liquid is sealed in both the chambers 9 and 9, thereby constituting a damper A.

Then, an angle clutch B will be described.

As shown in FIGS. 1 to 8, the rotational shaft 7 projecting from the cover 28 upwardly is inserted into the central hole 27a of a stationary plate 27 arranged on the inner cylinder 3, and recesses 27b, 27b provided at the peripheral edge thereof are respectively engaged with projections 3a, 3a formed on the upper end of the inner cylinder 3, thereby fixing the stationary plate 27 in a stacked state.

An intermediate plate 28 and a movable plate 29 are disposed in a stacked state on the stationary plate 27. The intermediate plate 28 is engaged with the rotational shaft 7 by engaging projections 28b, 28b projected inwardly from the central hole 27 with the grooves 7a, 7a formed on the rotational shaft 7, and the intermediate plate 28 is so restricted at its rotating angle as to be rotated at only a predetermined angle by engaging projections 29a and 27c projected on the outer peripheries of the movable plate 29 and the stationary plate 27 with grooves 28c and 28d formed on both upper and lower outer surfaces of the peripheries thereof.

The other end 30b of a return spring 30 internally mounted between the outer cylinder 2 and the inner cylinder 3 and latched at one end 30a thereof to the groove 2a of the outer cylinder 2 is latched to the groove 28c cut out on the outer periphery of the intermediate plate 28.

On the other hand, the movable plate 29 is fixed into the upper sub case 31 fixed to the rotational shaft 7 by engaging projections 29c, 29c projected from the inner periphery of the central hole 29b of the movable plate 29 with the projections 31a, 31a projected on the inner surface of the sub case 31 fixed to the shaft 7 via a stop screw 38.

In the exemplified embodiment as shown, three through holes 32, 32 are circumferentially opened at an equal interval on the rotating circumferential line of the intermediate plate 28, and rotary connectors 33, 33 of spheres or rolls, etc., are so respectively rotatably engaged within the through holes 32, 32 as to be loosely movable in upward and downward directions.

On the other hand, three recesses 34, 34 and 35, 35 for disengageably engaging the rotary connectors 33, 33 are respectively formed in substantially sectionally spherical shape having the same curvature as that of the rotary connector 33 in the same number as that of the through holes 32 of the intermediate plate 28 at an equal interval in a circumferential direction on the upper and lower surfaces of the intermediate plate 28 and the opposed surfaces 27d and 29d of the stationary plate 27 and the movable plate 29 opposed to the intermediate plate 28.

Here, the rotary connectors 33, 33 are formed, as evidently shown in FIGS. 8(a) to 8(d), in diameters R larger by a predetermined size than the thickness a of the intermediate plate 28, and so formed as to project in a predetermined size from the openings of the through holes 32 upward or downward in such a manner that the center 0 is always disposed at a position of a predetermined size b from the upper or lower surface of the intermediate plate 28 in the through holes 32.

On the other hand, the recesses 34, 34 and 35, 35 of the stationary plate 27 and the movable plate 29 are so set in depths in advance that, when the rotary connectors 33 are engaged, the rotary connectors 33 are not introduced into the central positions but the intermediate plate 28 the stationary plate 27 and the intermediate plate 28 and the movable plate 29, respectively, can be locked in the engaging states of the rotary connectors 33.

Figure 9A:
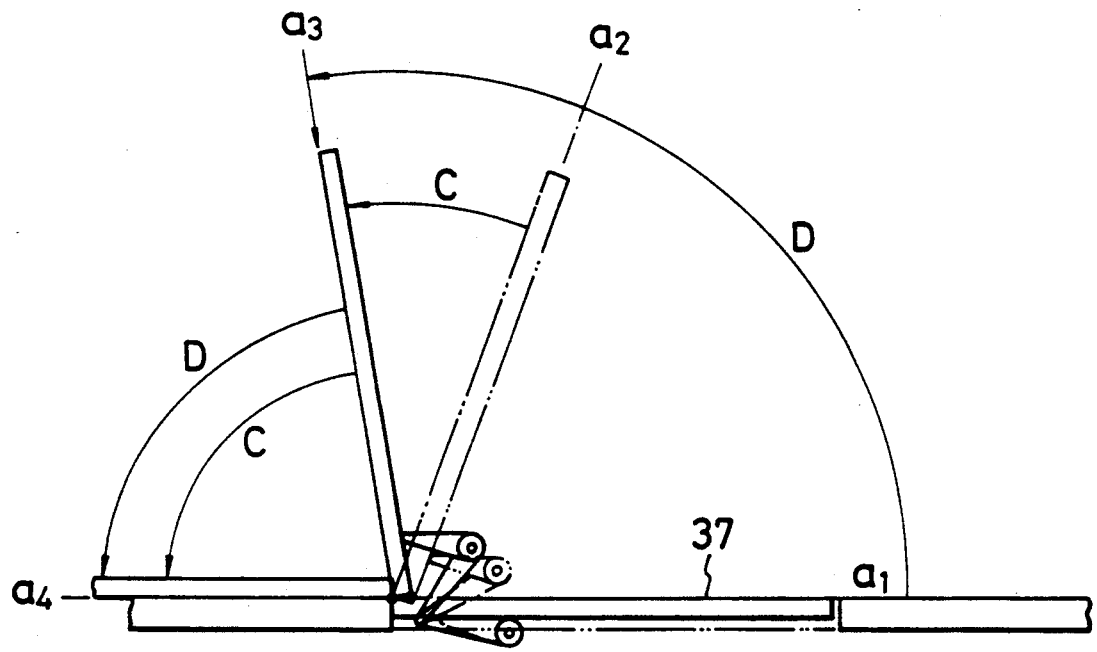
FIGS. 9(a) and 9(b) are explanatory views respectively showing a spring power locking angle, a door locking angle, a door freely stopping region, damper ON/OFF region of the door opening and closing directions.

The movable plate 29 locks the intermediate plate 28 by the rotary connectors 33, 33 at the position of closed door as shown in FIGS. 6(a) and 7(b). The movable plate 29 is released from the lock to the intermediate plate 28 at a spring power locking position $a_2$ where the door 37 is opened at a predetermined angle from the door closing position $a_1$ as shown in FIG. 9(a), and instead the stationary plate 27 and the movable plate 29 are so set in advance to predetermined positions that the intermediate plate 28 and the stationary plate 27 are locked from the spring power locking position $a_2$ to the door fully opening angle $a_4$, and fixed to the inner cylinder 3 and the sub case 31.

According to the second aspect of the embodiment of the invention, three door locking recesses 36, 36 are formed, in addition to the recesses 35, 35 at an equal interval in a circumferential direction on the same circumferential line as that of the recesses 35, 35 on the movable plate 29.

The door locking recesses 36, 36 are so formed as to deviate at a predetermined size in a circumferential direction with respect to the recesses 35, and formed in depths to be shallower than those of the recesses 35. When the door 37 is opened to a door opening angle $a_3$ shown in FIGS. 9(a) and 9(b), the rotary connectors 33, 33 are respectively engaged with both the recesses 34 of the stationary plate 27 and the locking recesses 36, 36 as shown in FIG. 7(c) and 8(c), thereby locking the stationary plate 27, the intermediate plate 28 and the movable plate 29. Thus, the door 37 is locked at the door opening angle $a_3$ as shown in FIG. 9(a) and 9(b).

Further, as shown in FIG. 10, a sub arm 39 capable of adjusting in length is pivotally secured to one side of the case 31. In the damper, the arm of the body case 1 is fixed by a mounting bracket 40 pivotally secured to the end of the arm 4 to the upper portion of the hanging base side of the door 37, while the sub arm 39 is mounted on the door 37 by fixing it to an upper frame 42 by the mounting plate 41 pivotally secured to the end of the arm 39.

Figure 8A:
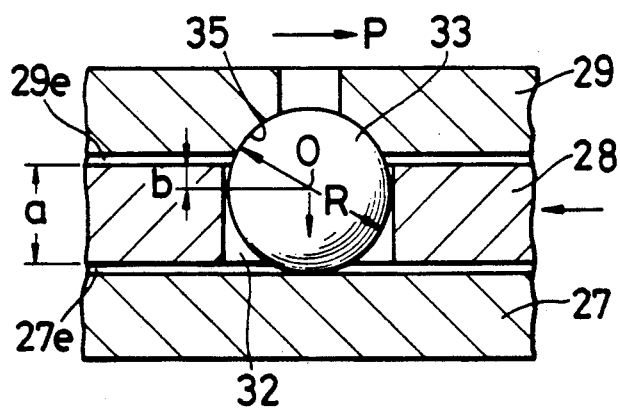
FIGS. 8(a), 8(b), 8(c) and 8(d) are longitudinal sectional views respectively showing the relationship of the positions between a rotary connector and a recess in the states shown in FIGS. 7(a), 7(b), 7(c) and 7(d)
Figure 8B:
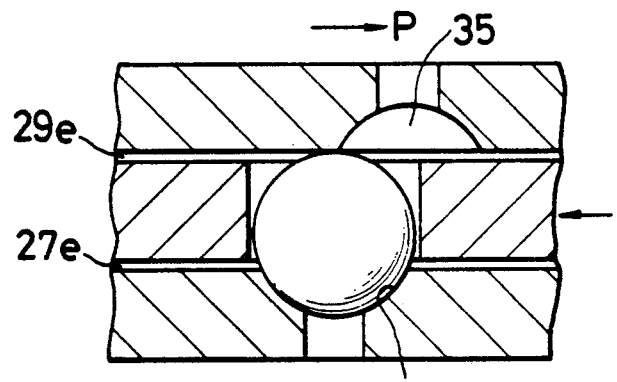
Figure 8C:
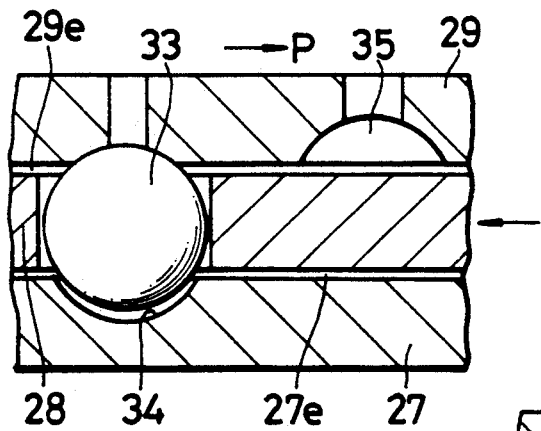

In the case of the first aspect of the embodiment of the invention, in the angle clutch B constructed as described above, when the movable plate 29 is rotated from the door closing position in FIGS. 6(a), 7(a) and 8(a) by a door opening force P in a direction of arrows as shown in FIGS. 6(a)-6(c), 7(a)-7(d) and 8(a)-8(d), the intermediate plate 28 is also rotated together.

Thus, the return spring 30 is rewound to generate power. (The recovering force of the return spring is accumulated.)

Figure 8D:
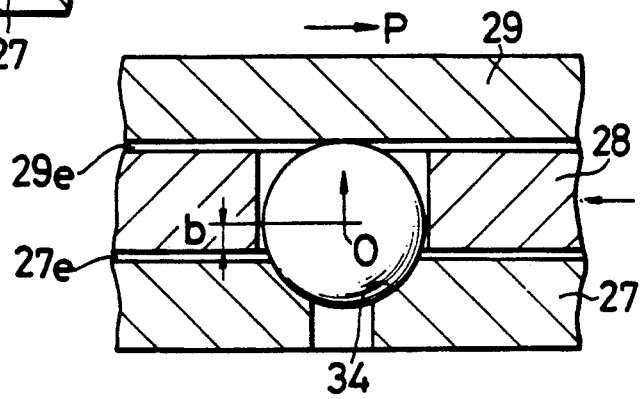
Figure 9B:
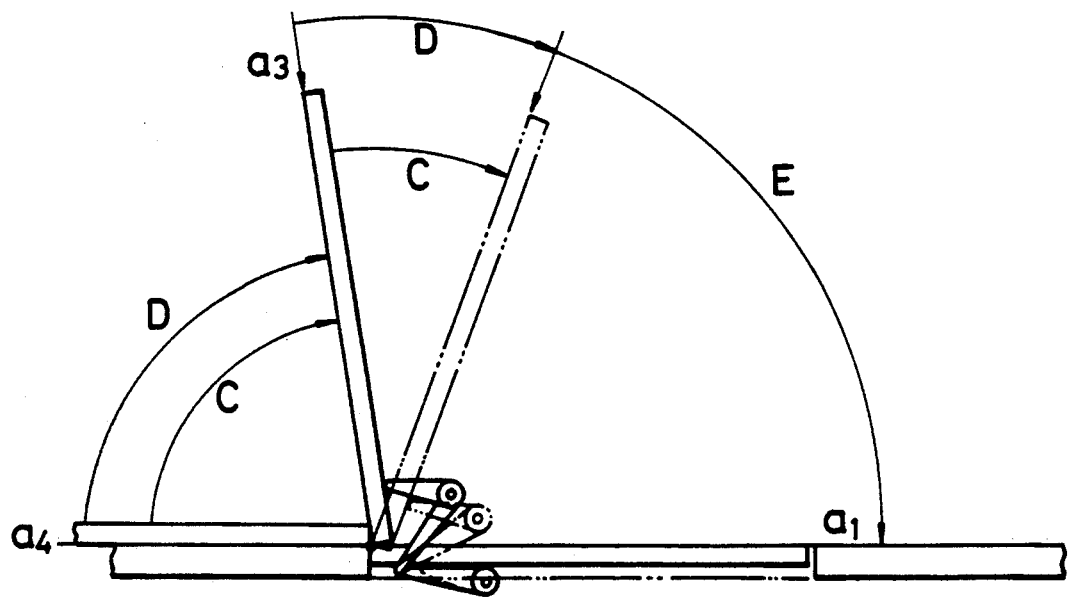

At the position shown in FIGS. 7(d) and 8(d), the recesses 34, 34 and 35, 35 of the stationary plate 27 and the movable plate 29 respectively coincide with the through holes 32, 32 of the intermediate plate 28 so that the intermediate plate 28 is not rotated any further. Therefore, when the movable plate 29 is continuously rotated, the rotary connectors 33, 33 are shifted from the recesses 35, 35 of the movable plate 29 to the recesses 34, 34 of the stationary plate 27 to be engaged, and the intermediate plate 28 is locked to the stationary plate 27.

Consequently, the power (recovering force) of the return spring 30 is locked at a predetermined door opening angle $a_2$ shown in FIGS. 9(a) and 9(b), and the movable plate 29 becomes a free state. Therefore, the door 37 becomes in a freely stopping state in a range from the door opening angle $a_2$ to the door fully closing angle $a_4$.

According to the second aspect of the embodiment of the invention, when the movable plate 29 becomes in the free state as described above, the rotary connectors 33, 33 generate forces tending to move upward. Therefore, when the movable plate 29 is further rotated, the rotary connectors 33 are respectively engaged with the recesses 36, 36 to become in the state as shown in FIG. 9(c), and the door 37 is locked to a predetermined door opening angle $a_3$ shown in FIGS. 9(a) and 9(b).

When the movable plate 29 is further rotated, it becomes in the state shown in FIGS. 7(d) and 8(d), the movable plate 29 becomes in free, and the door 37 becomes a freely stopping state.

In case of closing the door, the door 37 is automatically closed by the spring power from the door opening angle $a_2$ shown in FIG. 9(b) in the reverse operation to that of the door opening direction described above and the door is closed at the position $a_1$ in FIG. 9(b).

In FIGS. 6(a)-6(c), 7(a)-7(d) and 8(a)-8(d), reference numerals 27e and 29e denote rotary connector rotating grooves formed on the stationary plate 27 and the movable plate 29. In FIGS. 9(a) and 9(b), reference character C denotes a door freely stopping region; D, a damper OFF region; and E, a damper ON region.

Since the present invention is constituted as described above, according to the first aspect of the embodiment of the invention, the spring power is locked at the predetermined door opening angle, and the door free stopping region can be thereafter set therefrom up to the door fully opening angle. Therefore, the door can be freely stopped at the opening or closing position within the region. The door can be slowly and smoothly closed by the spring effect and the viscous resistance force of the high viscous liquid from the spring power locking position to the door closing position. Further, since mechanisms for obtaining the door closing position, the spring power locking position and the door freely stopping region are composed of locking or releasing of the lock of the intermediate plate and the movable plate or the intermediate plate and the stationary plate by the engagement or disengagement of the rotary connectors such as spheres, columns, etc. with or from the recesses, the door opening or closing resistance in case of obtaining the positions and the regions described above is reduced. Thus, the door can be not only smoothly opened or closed, but the spring power locking position and the angle range of the door freely stopping region can be simply changed merely by altering the engaging positions of the rotary connectors with the recesses. Even if the door is abruptly opened or closed or the door is affected by strong wind pressure in the door opening state, the members are not effected by strong impact. Therefore, since the door closer is scarcely damaged and the structure of the door closer can be simplified, its durability is excellent with inexpensive manufacture.

According to the second aspect of the embodiment of the invention, the door locking position is provided in the range of the door freely stopping region. Therefore, various actions of the door can be achieved by arbitrarily altering the door freely stopping region and the door locking position.

What is claimed is:

1. A door closer comprising:

a damper having a body case including an arm fixed to a door, a rotational shaft supported at the center of said body case and formed in said body case, a pair of chambers filled with high viscous liquids communicating via passages of said rotational shaft, a pair of rotary blades respectively having passages with check valves on said rotational shaft and internally mounted in said pair of chambers, said rotary blades being rotated together with said rotational shaft by a sub case fixed with a sub arm against a return spring at the time of opening the door, the door being automatically closed by the accumulated recovering force of said spring at the time of closing the door, the door being effected by the resistance force of said high viscous liquid against the closing door, a stationary plate fixed to said body case disposed vertically in a stacked state by inserting the rotational shaft of said damper into the center thereof, an intermediate plate so engaged with said rotational shaft as to be rotatable at a predetermined angle against said return spring by said rotational shaft, a movable plate so engaged with said sub case as to be rotatable together with said sub case, a plurality of rotary connectors respectively movably engaged with a plurality of through holes formed at an interval in a circumferential direction on the rotating circumferential line of said intermediate plate and having diameters larger than the thickness of said intermediate plate, and an angle clutch made up of said stationary plate, said intermediate plate, said movable plate and said rotary connectors such that recesses in said stationary plate and recesses in said movable plate alternately engage and disengage said rotary connectors in through holes of said intermediate plate in such a manner that said movable plate and said intermediate plate can be locked within a range from a door closing positions to a predetermined door opening angle, said movable plate is released from the lock to said intermediate plate by the rotation of said movable plate in the door opening direction at a predetermined door opening angle in the range therefrom up to the door fully opening angle, and said intermediate plate can be locked to said stationary plate.

2. A door closer comprising:

a damper having a body case including an arm fixed to a door, a rotational shaft supported at the center of said body case and formed in said body case, a pair of chambers filled with high viscous liquids communicating via passages of said rotational shaft, a pair of rotary blades respectively having passages with check valves on said rotational shaft and internally mounted in said pair of chambers, said rotary blades being rotated together with said rotational shaft by a sub case fixed with a sub arm against a return spring at the time of opening the door, the door being automatically closed by the accumulated recovering force of said spring at the time of closing the door, the door being effected by the resistance force of said high viscous liquid against the closing door, a stationary plate fixed to said body case disposed vertically in a stacked state by inserting the rotational shaft of said damper into the center thereof, an intermediate plate so engaged with said rotational shaft as to be rotatable at a predetermined angle against said return spring by said rotational shaft, a movable plate so engaged with said sub case as to be rotatable together with said sub case, a plurality of rotary connectors respectively movably engaged with a plurality of through holes formed at an interval in a circumferential direction on the rotating circumferential line of said intermediate plate and having diameters larger than the thickness of said intermediate plate, and an angle clutch made up of said stationary plate, said intermediate plate, said movable plate and said rotary connectors such that recesses in said stationary plate and recesses in said movable plate alternately engage and disengage said rotary connectors in through holes of said intermediate plate in such a manner that said movable plate and said intermediate plate can be locked within a range from a door closing position to a predetermined door opening angle, said movable plate is released from the lock to said intermediate plate by the rotation of said movable plate in the door opening direction at a predetermined door opening angle in the range therefrom up to the door fully opening angle, and said intermediate plate can be locked to said stationary plate, wherein a plurality of door locking recesses to be respectively disengageably engaged with said rotary connectors are formed in depths shallower than those of said recesses of said movable plate corresponding to said recesses of said movable plate on the same circumferential line as that of said plurality of recesses of said movable plate at a wider door opening angle than a predetermined door opening angle at said movable plate so that said movable plate can be locked to said intermediate plate and said stationary plate.

* * * * *